United States Patent [19]
Pham et al.

[11] Patent Number: 5,685,495
[45] Date of Patent: Nov. 11, 1997

[54] DEVICE FOR PROJECTING A COATING PRODUCT HAVING A ROTARY SPRAYING ELEMENT AND TOOL FOR FITTING AND REMOVING SUCH ROTARY ELEMENT

[75] Inventors: Van Tan Pham, Villard Bonnot; Djamel Merabet, Grenoble, both of France

[73] Assignee: Sames S.A., Meylan, France

[21] Appl. No.: 436,208
[22] PCT Filed: Nov. 17, 1993
[86] PCT No.: PCT/FR93/01122
§ 371 Date: May 15, 1995
§ 102(e) Date: May 15, 1995
[87] PCT Pub. No.: WO94/12286
PCT Pub. Date: Jun. 9, 1994

[30] Foreign Application Priority Data

Dec. 1, 1992 [FR] France .................. 92 14442

[51] Int. Cl.$^6$ .................................................. B05B 15/08
[52] U.S. Cl. ............................................................ 239/588
[58] Field of Search ............................ 239/588, 600, 239/587.1, 223, 224, 702, 703, 700, 290; 29/258, 256, 243.58, 259–262

[56] References Cited

U.S. PATENT DOCUMENTS

| | | | |
|---|---|---|---|
| 3,067,952 | 12/1962 | Aghnides | 239/431 |
| 3,674,413 | 7/1972 | Fraser | 239/588 |
| 3,759,445 | 9/1973 | King | 239/588 |
| 4,776,520 | 10/1988 | Merritt | 239/700 |
| 5,064,123 | 11/1991 | Aiello | 239/588 |
| 5,165,156 | 11/1992 | Shultz | 29/258 |
| 5,370,316 | 12/1994 | Landcaster | 239/588 |

*Primary Examiner*—Robert J. Oberleitner
*Assistant Examiner*—C. T. Bartz
*Attorney, Agent, or Firm*—Loeb & Loeb

[57] ABSTRACT

System for fixing a rotary spraying element to a drive rotor. According to the invention, the rotary spraying element (12) for projecting the coating product is attached to drive means (14) by means of an elastic coupling element (25). Centrifugal force increases assembly retaining force.

16 Claims, 2 Drawing Sheets

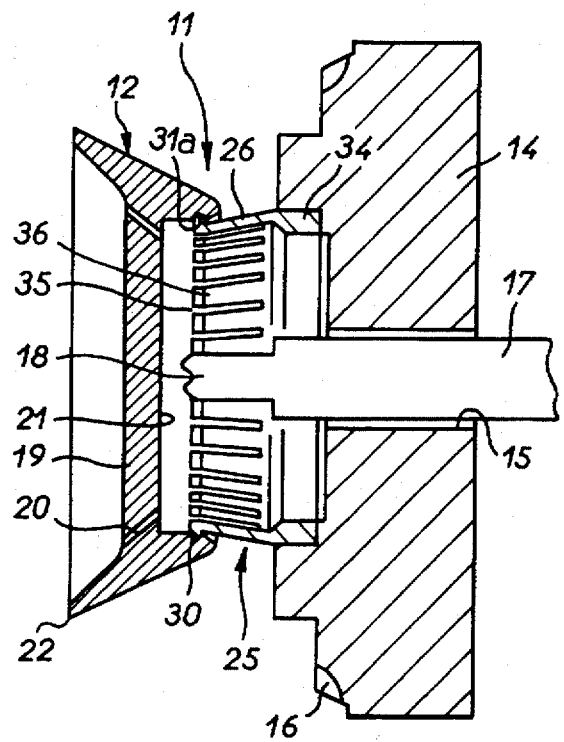
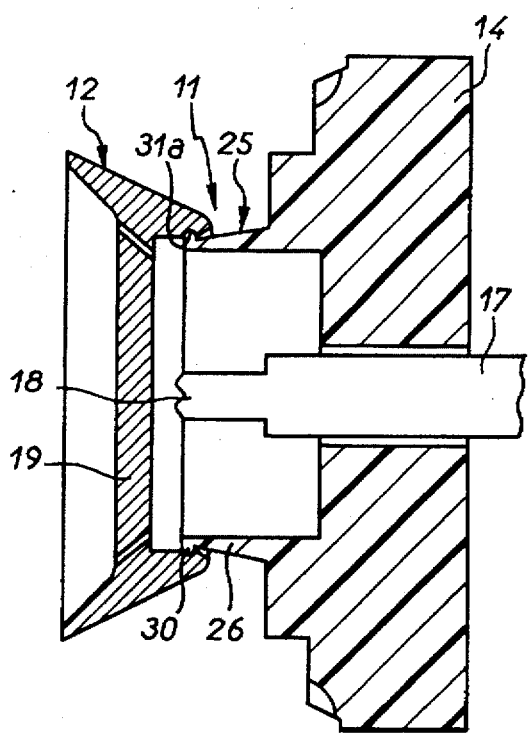
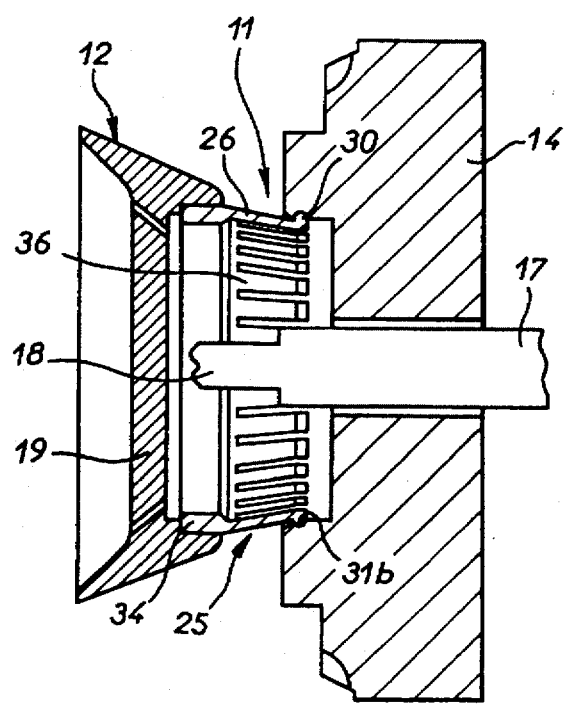

DEVICE FOR PROJECTING A COATING PRODUCT HAVING A ROTARY SPRAYING ELEMENT AND TOOL FOR FITTING AND REMOVING SUCH ROTARY ELEMENT

BACKGROUND OF THE INVENTION

The invention concerns a coating product sprayer device having a rotary sprayer member. The sprayer member is preferably in the form of a bowl or bell, for example, and is rotated at very high speed by a turbine.

The invention is more particularly concerned with an improvement to make the sprayer device lighter in weight and easier to handle and to make it easier to mount and to demount the rotary sprayer member.

The invention also concerns a tool for mounting and demounting the rotary sprayer member.

In prior art installations for spraying a liquid coating product such as an organic solvent or water based paint, the coating product is atomized to form a spray of fine droplets which are then attracted electrostatically onto the object to be coated. The coating product is atomized by a bowl-shape rotary sprayer member rotated at high speed. The rotation speed can be between 30 000 rpm and 100 000 rpm; it is usually between 40 000 rpm and 60 000 rpm.

Given these rotation speeds, it is desirable for the rotary sprayer member to be as light as possible and for it to be precisely dynamically balanced, especially if it is driven by a turbine with air and/or magnetic bearings which are very sensitive to so-called "imbalance" effects, which can damage them.

A rotary sprayer member of this kind is conventionally assembled to the rotor of the turbine by a set of six to eight bolts which are equi-angularly distributed in the circumferential direction. This type of assembly significantly increases the weight of the rotary assembly and can complicate dynamic balancing. Also, mounting and demounting the rotary sprayer member for cleaning and maintenance are difficult and time-consuming.

SUMMARY OF THE INVENTION

The invention proposes a new type of assembly which does not have the drawbacks mentioned above.

In a first aspect the invention consists in a liquid coating product sprayer device comprising a rotary sprayer member and drive means for rotating said sprayer member, characterized in that said rotary sprayer member is attached to said drive means by an elastic coupling member including at least one nesting ring adapted to expand radially in response to centrifugal force and engaged with an interior annular surface of a relatively more rigid part of said rotary sprayer member or said drive means.

In a preferred embodiment of the invention the nesting ring includes a bead or other annular projection extending radially outwards and the aforementioned interior annular surface includes a groove the shape and size of which are adapted to accommodate the annular bead or the like. The elastic coupling member can be in the form of a ring having at least one such portion elastically and uniformly deformable in the radial direction. This is the case in particular when said elastic coupling member is made from an elastically deformable plastics material.

In another embodiment of the invention the nesting ring is an annular portion in which are formed slots or other like longitudinal openings defining a plurality of flexible blades. In this case the aforementioned bead is defined at the ends of said blades and therefore has a structure segmented by said slots. In this case said nesting ring can be a metal ring.

The invention will be better understood and other advantages of the invention will emerge more clearly from the following description of various embodiments of a coating product sprayer device of the invention and a mounting/demounting tool, given by way of example only and with reference to the appended drawings in which:

BRIEF DESCRIPTION OF THE DRAWING

FIG. 1 is a diagrammatic view in longitudinal section of part of a liquid coating product sprayer device of the invention;

FIG. 2 is a view similar to FIG. 1 of another embodiment of the invention;

FIG. 3 is a view similar to FIG. 1 of a further embodiment of the invention;

DESCRIPTION OF THE PREFERRED EMBODIMENTS

Figure 4:
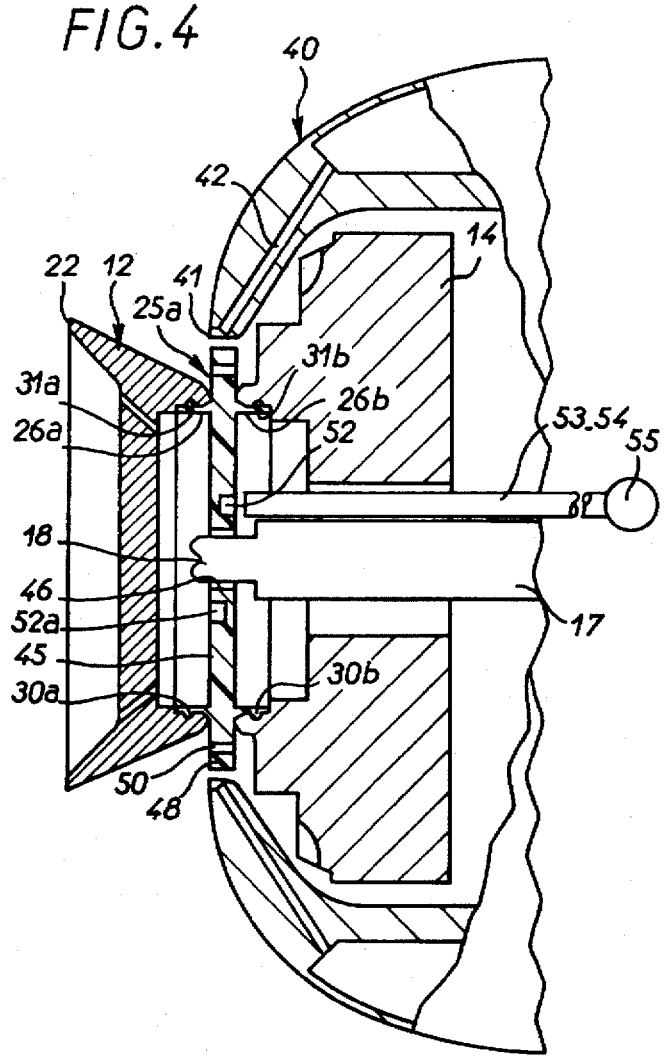
FIG. 4 is a diagrammatic view in longitudinal section of the end part of a further embodiment of coating product sprayer device of the invention.

Referring to FIGS. 1 to 3, in which like structural members are identified by the same reference numbers, a liquid coating product sprayer device 11 includes a bowl-shape rotary sprayer member 12 rotated at high speed by a turbine, only the rotor 14 of which is shown here. In this example, this is a pneumatic turbine and the rotor carries drive vanes 16 onto which jets of air are directed. The radial suspension bearings and the axial stabilization means of the rotor are of the pneumatic and/or magnetic and/or ball-bearing type and are not shown as they do not constitute part of the invention. The rotor 14 has an axial passage 15 through which extends a coating product feed pipe 17 ending at an ejector nozzle 18 facing and at a small distance from an interior radial flange 19 of the rotary sprayer member 12. The flange 19 conventionally has a ring of holes 20 at its periphery. Due to centrifugal force, the coating product which is deposited onto the rear face 21 of the flange 19 flows through the latter and along the inside wall of the bowl-shape part to the discharge edge 22 from which it is atomized in the form of a spray of fine droplets. In the case of electrostatic application, if the rotary sprayer member is a metal member it can itself be connected to the high voltage. If it is made of an insulative material a bombardment type charging system can be used.

In accordance with one important feature of the invention, the rotary sprayer member 12 is attached to the drive means (specifically to the rotor 14 in this example) by an elastic coupling member 25 including at least one nesting ring 26 adapted to expand radially in response to centrifugal force. The nesting ring engages through appropriately shaped couplings with an inside annular surface of a relatively more rigid part of said rotary member (FIGS. 1 and 2) or of said drive means (FIG. 3). The shapes of the couplings are such that the clamping force between the nesting ring 26 and the more rigid part with which it is engaged increases with the centrifugal force, due to deformation of said nesting ring 26.

This type of mounting also achieves self-centering of the rotary sprayer member 12 relative to the rotor 14 when they rotate. To be more precise, the nesting ring 26 includes a bead 30 or any like annular projection extending radially outwards and the inside annular surface with which it engages includes a groove 31a or 31b the shape and size of which are adapted to accommodate the annular bead or the like. This groove is the groove 31a in the rotary sprayer member or the groove 31b in the rotor 14.

As shown in the drawings, the elastic coupling member 25 is generally annular and the previously mentioned nesting ring is a portion of it which is elastically and uniformly deformable in the radial direction.

In the FIG. 1 example the elastic coupling member 25 is fastened to the rotor 14. To this end it includes a rigid ring 34 fixed into an annular cavity on the rotor, in which it is a force-fit or into which it is screwed, for example.

In the FIG. 2 example the elastic coupling member 25 is an integral part of the rotor 14.

In the FIG. 3 example the elastic coupling member 25 is fastened to the rotary sprayer member 12. The ring 34 is fixed into an annular cavity in the latter, in which it is a force-fit or into which it is screwed, for example.

In the FIG. 1 and 3 examples the nesting ring 26 is an annular portion with slots 35 or other like openings defining a plurality of more flexible blades 36. The bead 30 is defined at the ends of these blades and is therefore segmented by the slots. This type of nesting ring is especially suitable when the elastic coupling member is made of metal, for example of stainless steel. This member can be made of plastics material, however.

If the elastic coupling member is made from plastics material, said nesting ring can be a non-segmented ring, as shown in FIG. 2, provided that it is able to deform uniformly in the radial direction due to the effect of centrifugal force.

In the FIG. 2 embodiment the coupling member 25 is an integral part of the rotary part. In this case the rotor 14 is also made from plastics material, which further reduces the weight of the device.

Other combinations are possible, of course. In particular, the elastic coupling member molded in one piece with the rotor can also include flexible blades. Alternatively, it can be an integral part of the rotary sprayer member.

In FIG. 4 structural members analogous to those of FIGS. 1 to 3 are identified by the same reference number. The sprayer device is shown more completely, in particular complete with the front portion of a cap 40 covering the rotor 14. This cap includes a circular opening 41 beyond which is the rotary sprayer member 12. Air ejector passages 42 which are equi-angularly spaced in the circumferential direction in the cap are connected to a compressed air supply (not shown). These passages discharge through openings near the opening 41 and, in the conventional way, the ejected air forms an "air skirt" around the rotary sprayer member 12. This arrangement prevents soiling of the rotary parts and contributes to the conformation of the jet of atomized coating product.

In this embodiment of the invention the elastic coupling member 25a is made of plastics material and has two coaxial and aligned nesting rings 26a, 26b respectively nested with said rotary sprayer member 12 and said drive means, i.e. the rotor 14. The two nesting rings are attached to a flange 45 of the coupling member 25a and extend on either side of this flange, the rotation axis of which is naturally coincident with that of the rotor 14. The flange 45 has a central hole 46 through which the nozzle 18 passes. It also has an extension 48 extending radially outwards as far as the opening 41 in the cap 40. Consequently, the elastic coupling member 25a is shaped to block most of the opening 41 and consequently to protect the turbine from soiling from the outside. The flange 45 also has, in the extension 48, a series of holes 50 which are regularly disposed in a helical manner (this cannot be seen in the drawing) so as to draw air from the inside of the cap 40 to the outside, in particular to create a flow of air at the rear of the bowl-shape rotary sprayer member to limit soiling of the external surface of the latter. The flange 45 is also used to mount a system for measuring the rotation speed of the rotary sprayer member 12. The flange also has a recess 52 on its inside face, on the same side as the rotor 14 and near the hole 46. This recess is elongate in the circumferential direction and moves past orifices of two side-by-side pipes 53, 54. Only one of these pipes can be seen in FIG. 4. One pipe is connected to a compressed air supply and the other is coupled to a microphone sensor 55. The combination of the two pipes thus constitutes an acoustic link the characteristics of which are modified when the recess 52 passes them on each revolution. The microphone sensor 55 therefore produces a signal at a frequency representative of the rotation speed of the sprayer member. Another recess 52a is formed on the other side of the flange 45, symmetrically about the rotation axis, to preserve the dynamic balance of the system.

Each of the two nesting rings 26a, 26b includes a bead 30a, 30b respectively nested in a groove 31a in the rotary sprayer member 12 and in a groove 31b on the rotor 14. It is clear that if the rotary sprayer member 12 has to be demounted it can be detached from the coupling member 25a or the coupling member can be detached from the rotor 14. The former is sufficient for cleaning or changing the bowl and the latter provides access to the turbine.

The two nesting rings 26a and 26b could naturally be of the same kind shown in FIGS. 1 and 3 in which the elasticity is conferred by the disposition of the blades.

In all cases shaped couplings are provided so that, when rotation is stopped, nesting requires only moderate force. However, as soon as the assembly is rotated at the speeds mentioned above, centrifugal force deforms the nesting ring, or each such ring, in a direction such that the clamping between the assembled parts is increased. This also achieves self-centering of the components rotating together.

Figure 6:
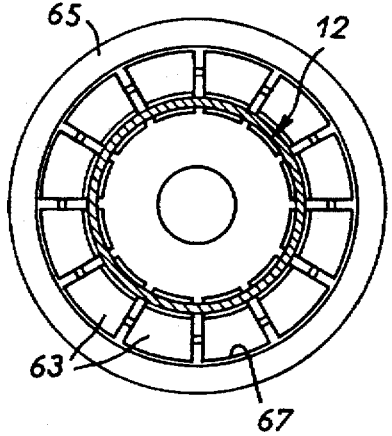
FIG. 6 is a view in section on the line VI—VI in FIG. 5.
Figure 5:
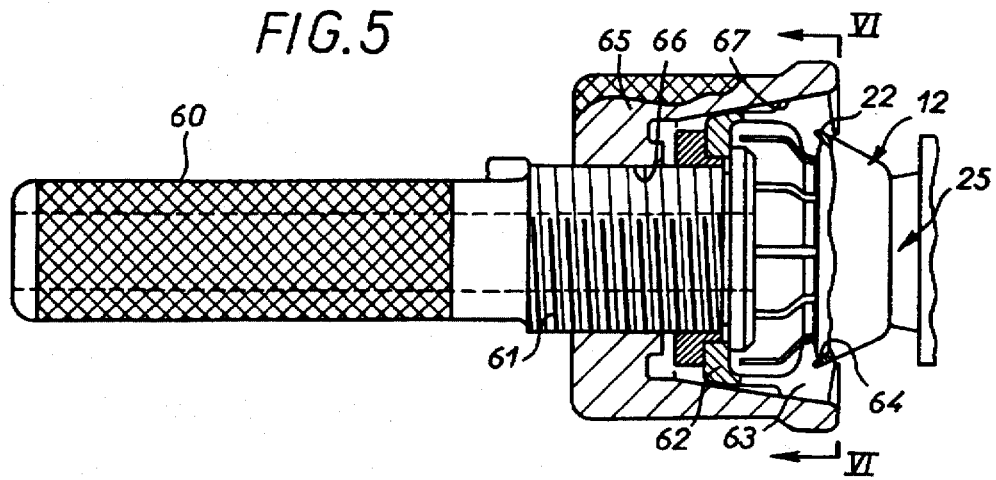
FIG. 5 is a part-sectional view of a tool for mounting/demounting a rotary sprayer member of the invention, the tool being shown engaged with the latter member.

FIGS. 5 and 6 show a tool for mounting and demounting the rotary member 12 at the end of the elastic coupling member 25. The tool has a handle 60 with a screwthreaded portion 61 at the end of which is fixed a segmented ring 62 providing a plurality of flexible clamps 63 which are equi-angularly spaced in the circumferential direction. Each clamp has a notch 64 shaped to fit to the edge 22 of the rotary sprayer member 12. The set of notches normally lies on a circumference larger than that of the edge in question, however. A clamping ring 65 is provided coaxial with and outside the segmented ring 62. It has a screwthreaded bore 66 screwed onto the screwthreaded portion 61 of the handle. The inside surface 67 of the clamping ring is frustoconical in shape and can be brought into contact with the flexible clamps 63. Because it is threaded onto the screwthreaded portion 61, the clamping ring 65 can move in the axial direction relative to the ring 62 and cause simultaneous flexing of the clamps 63 in the radially inwards direction. In this way said clamps 63 grip the edge 22 of the sprayer member, which greatly facilitates nesting or unnesting of the rotary sprayer member.

We claim:

1. Liquid coating product sprayer device comprising a rotary sprayer member (12) and drive means (14) for rotating said sprayer member, characterized in that said rotary sprayer member is attached to said drive means by an elastic coupling member (25) including at least one nesting ring (26) adapted to expand radially in response to centrifugal force and engaged with an interior annular surface of a relatively more rigid part of said rotary sprayer member or said drive means.

2. Device according to claim 1 characterized in that said nesting ring (26) includes an annular projection extending radially outwards and said interior annular surface includes a groove (31a, 31b) the shape and size of which are adapted to accommodate said annular projection.

3. Device according to claim 1 characterized in that said elastic coupling member is in the form of a ring and in that said nesting ring constitutes a portion elastically and uniformly deformable in the radial direction.

4. Device according to claim 1 characterized in that the aforementioned elastic coupling member (25) is fastened to a rotary part (14) of said drive means.

5. Device according to claim 4 characterized in that said elastic coupling member (25) is an integral part of said rotary part (FIG. 2).

6. Device according to claim 1 characterized in that said elastic coupling member is fastened to said rotary sprayer member (FIG. 3).

7. Device according to claim 2 characterized in that said nesting ring is an annular portion in which are formed openings defining a plurality of flexible blades (36) and in that said bead (30) is defined at the ends of said blades and has a structure segmented by said openings.

8. Device according to claim 2 characterized in that said nesting ring is made from an elastically deformable plastics material.

9. Device according to claim 1 characterized in that said elastic coupling member includes two coaxial nesting rings (26a, 26b) respectively coupled to said rotary sprayer member (12) and to said drive means (14) by nesting therewith.

10. Device according to claim 9 characterized in that said coupling member includes a flange (45) extending between the two nesting rings.

11. Device according to claim 10 characterized in that said flange includes an extension (48) extending radially outwards to the vicinity of a cap (40) covering said drive means.

12. Device according to claim 11 characterized in that said extension of the flange includes a series of holes (50) equi-angularly spaced in the circumferential direction and oriented to create a flow of air from inside said cap towards the outside thereof.

13. Device according to claim 12 characterized in that said flange includes a recess (52) and in that a microphone sensor (55) is coupled to said recess by an acoustic link.

14. Tool for mounting/demounting a rotary sprayer member coupled to drive means by a nesting elastic coupling member in accordance with any one of the preceding claims characterized in that it includes a plurality of flexible clamps (63) arranged in a ring at the end of a handle, (60), each clamp including a notch (64) shaped to fit to an edge of said rotary member, and a clamping ring (65) extending coaxially around said ring and having a substantially frustoconical inside surface (67) engaged with said flexible clamps (63), said clamping ring being mobile axially relative to said ring to cause simultaneous flexing of said clamps.

15. Device according to claim 2 wherein said annular projection is constituted by a bead.

16. Device according to claim 7 wherein said openings are slots.

* * * * *